United States Patent Office
3,472,832
Patented Oct. 14, 1969

3,472,832
PEPTIDES RELATED TO CAERULEIN
Luigi Bernardi, Milan, Germano Bosisio, Palazzolo Milanese, and Roberto de Castiglione and Onofrio Goffredo, Milan, Italy, assignors to Società Farmaceutici Italia, Milan, Italy, a corporation of Italy
No Drawing. Filed May 9, 1967, Ser. No. 637,095
Claims priority, application Italy, Aug. 9, 1966, 18,411/66
Int. Cl. C07g 7/00
U.S. Cl. 260—112.5     6 Claims

ABSTRACT OF THE DISCLOSURE

The invention teaches the decapeptide L-pyroglutamyl-L - glutaminyl - L-aspartyl-L-tyrosyl-L-threonyl-glycyl-L-tryptophanyl - L - methionyl-L-aspartyl-L-phenylalaninamide wherein the phenol group of the tyrosyl radical is free or blocked by a sulfuric radical, and the alcohol group of the threonyl radical is free or blocked by an aliphatic acyl radical having from 1 to 4 carbon atoms, and its non-toxic, pharmaceutically acceptable salts with an organic and inorganic base.

The decapeptide of the present invention and its derivatives display a high polyvalent biological activity and may be employed in the therapy of various affections, both in human and veterinary field. They display hypotensive activity and stimulate the motility of the gastroenteric duct and the various secretions of the connected glands.

---

The present invention relates to a new therapeutically useful decapeptide and its salts and teaches a process for their preparation. More particularly, the present invention has as an object the decapeptide L-pyroglutamyl-L-glutaminyl - L-aspartyl-L-tyrosyl-L-threonyl-glycyl - L tryptophanyl - L - methionyl-L-aspartyl-L-phenylalaninamide wherein the phenol group of the tyrosyl radical is free or blocked by a sulfuric radical, and the alcohol group of the threonyl radical is free or blocked by an aliphatic acyl radical having from 1 to 4 carbon atoms, and its non-toxic, pharmaceutically acceptable salts with an organic and inorganic base.

The decapeptide of the present invention and its derivatives display a high polyvalent biological activity and may be employed in the therapy of various ailments, both in human and veterinary fields.

There are numerous possibilities of synthesis of the decapeptide of the present invention which essentially consist in appropriate successive condensations of protected amino acids or polypeptides. The condensation is carried out so that the resulting decapeptide has the desired sequence of ten amino acids. The amino acids and polypeptides which, from time to time, are condensed have their amino and carboxyl groups, not involved in the formation of the peptidic linkage, duly blocked by a protecting group capable of being removed in known manner by acidolysis or hydrogenolysis. For the protection of the amino group, the following protecting groups may be employed: tosyl (p-toluenesulfonyl) carbobenzoxy (carbobenzyloxy), carbo-t-butoxy, trityl (triphenylmethyl), formyl, trifluoroacetyl, and others usually employed in polypeptide chemistry. For the protection of the carboxyl group, the following protecting groups may be employed: methyl, ethyl, t-butyl, benzyl, p-nitrophenyl and others usually employed in this field.

The condensation between the amino group of one molecule and the carboxyl group of another molecule to form the peptidic linkage may be carried out according to the usual methods known in polypeptide chemistry, for instance through a suitable activated acyl-derivative such as mixed anhydride, an azide, a p-nitrophenyl ester and 2,4,5-trichlorophenyl ester, or by direct condensation between the free amino group and the free carboxyl group, in the presence of a suitable condensing agent such as a carbodiimide of the group consisting of a dicyclohexylcarbodiimide, 1-cyclohexyl-3-morpholinylcarbodiimide and others known in literature. The condensation may be carried out in a suitable solvent of the group of N,N-dialkylformamides, lower aliphatic nitriles and pyridines, for example dimethylformamide, acetonitrile and pyridine. The reaction starts at from −20° C. to room temperature and may be completed at from room temperature to 35° C. for a period of from 12 to 120 hours.

Typical salts of the decapeptide of the invention are the sodium salt, potassium salt, magnesium salt, calcium salt, gluconate, tartrate, malate, ethylenediamine salt and the other non-toxic, pharmaceutically acceptable salts.

As said above, there are many possible syntheses for the decapeptide of the invention. To illustrate the invention, some examples for its preparation are shown.

The tetrapeptide, L-pyroglutamyl-L-glutaminyl-L-aspartyl-L-tyrosine-azide (I), is condensed with the hexapeptide, L - threonyl-glycyl-L-tryptophanyl-L-methionyl-L-aspartyl-L-phenylalaninamide (II), having the hydroxyl of the threonyl radical blocked by an acyl radical, in a suitable solvent, such as dimethylformamide, to obtain the decapeptide, L-pyroglutamyl-L-glutaminyl-L-aspartyl-L - tyrosyl-L-threonyl-glycyl-L-tryptophanyl-L-methionyl-L-aspartyl-L-phenylaninamide (III) having the hydroxy group of the threonyl radical blocked by an acyl radical. The decapeptide (III) is treated, at low temperature, with the complex anhydrous pyridine sulfuric anhydride finally to obtain the decapeptide, L-pyroglutamyl - L - glutaminyl-L-aspartyl-L-tyrosyl-L-threonyl-glycyl - L - tryptophanyl-L-methionyl-L-aspartyl-L-phenylalaninamide (IV) having the phenolic group of the tyrosyl radical protected by a sulfate radical and the hydroxyl of the threonyl radical protected by an acyl radical.

Finally, by mild alkaline hydrolysis of the decapeptide (IV) one obtains the decapeptide, $$\overset{\text{OSO}_3\text{H}}{\text{L-pyroglutamyl-L-glutaminyl-L-aspartyl-L-tyrosyl-L-threonyl-}}$$
glycyl-L-tryptophanyl-L-methionyl-L-aspartyl-L-phenylalaninamide wherein the hydroxy group of the radical threonyl is free.

The foregoing condensation may be represented by the following scheme with the symbols usually employed in polypeptide chemistry:

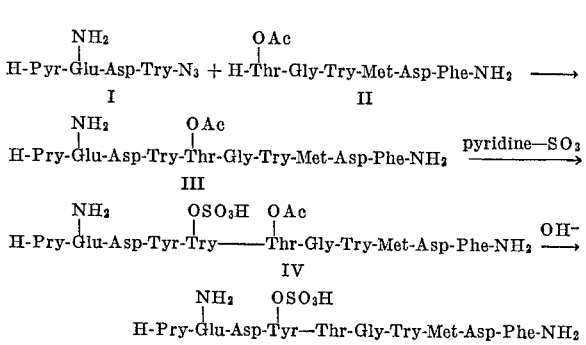

As stated above, there are different routes for preparing the decapeptide (III, IV, V) in agreement with the methods well-known in the polypeptide chemistry and used in the formation of a polypeptide chain. An example thereof follows:

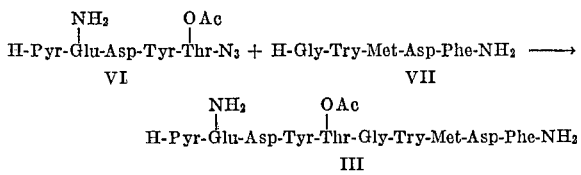

From the decapeptide III the decapeptide V is obtained, as above mentioned.

Analogous results are also obtained when another condensation through p-nitrophenyl esters or 2,4,5-trichlorophenyl esters is employed instead of that through the azide.

The decapeptide of the invention having a sulfuric acid radical, gives salt with organic and inorganic bases; both this product and its derivatives have a high polyvalent biologic action; in fact, they display hypotensive activity and stimulate the motility of the gastro-enteric duct and the various secretions of the connected glands.

The following examples serve to illustrate the invention without limiting it.

EXAMPLE 1

Preparation of the first intermediate

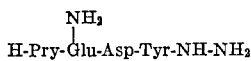

7.5 grams of carbo-t-butoxy-L-tyrosine (J. Am. Chem. Soc. 75, 1953, page 950) are condensed through the mixed ethoxyformic anhydride according to the method described by Greenstein et al. Chemistry of the Amino Acids, page 978 (1961), with 4.150 g. of carbobenzoxy-hydrazine (Ber. 47, page 2183 (1914)). After one night at room temperature, the mixture is evaporated in vacuo to dryness. The oily residue, dissolved in ethyl acetate, is washed in the cold with 0.5 N hydrochloric acid, with an aqueous solution of soduim bicarbonate and with water to neutrality. The mixture is evaporated in vacuo to dryness and the residue is crystallized from ether-petroleum ether. By successive recrystallization from ethyl acetate/petroleum ether, 7.700 g. of CTB-Tyr-NH-NH-CBO, melting at 118–120° C., are obtained; $[\alpha]_D^{20}=-1.7°$ (c.=1 dimethylformamide).

2.2 g. of this product are allowed to stand for 40 minutes at room temperature, in a solution of anhydrous hydrogen chloride in glacial acetic acid (1.33 N). The mixture is evaporated to dryness in vacuo. The oily residue is taken up and pulped with anhydrous ether. The solid product so obtained is filtered, washed with anhydrous ether and dried. 1.89 g. of H-Tyr-NH-NH-CBO·HCl melting at 125°–128° C. (with decomposition) are obtained; $[\alpha]_D^{21}=38.3$ (c.=1 in 95% acetic acid); $E_{1.2}=0.75$ Glu.

To the solution of this product in dimethylformamide in the presence of an equivalent of triethylamine, an equivalent of the mixed anhydride prepared in anhydrous tetrahydrofurane from 1.616 g. of

(J. Am. Chem. Soc. 81, page 620 (1965)) and 0.542 g. of ethyl chloroformate according to Greenstein et. al. (above cited) is added in the cold. After one night at room temperature, the mixture is evaporated to dryness in vacuo, the oily residue is taken up with ethyl acetate, washed with 0.5 N hydrochloric acid, with an aqueous solution of sodium bicarbonate and with water to neutrality. After elimination of the solvent, the oily residue is crystallized from chloroform-petroleum ether and 2.8 g. of

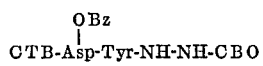

are obtained, melting at 138–140° C., $[\alpha]_D^{20}=-20.7°$ formamide).

1.100 g. of this product is allowed to stand for 40 minutes at room temperature in a solution of anhydrous hydrogen chloride (1.33 N) in glacial acetic acid. The solvent is removed in vacuo, the white residual foam is pulped in anhydrous ether and the above said solid thus obtained is filtered and dried. 1.03 g. of

($E_{1.2}$ 0.65 Glu) are obtained. To the solution of this product, in dimethylformamide in the presence of the equivalent of triethylamine, 0.624 g. of

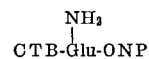

(said product melting at 150–153° C. may be prepared from

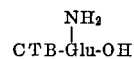

and p-nitrophenol in the presence of a condensing agent such as dicyclohexylcarbodiimide) are added. The mixture is kept for 2 days under stirring at 35° C. It is evaporated in vacuo to dryness and the oily residue is taken up with ethyl acetate. After the acid and alkaline washings, it is crystallized from methanol-benzene and successively from acetone-petroleum ether.

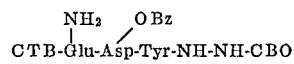

melting at 173–175° C., is obtained; $[\alpha]_D^{20}=-22.2°$ (c.=1 dimethylformamide).

2.55 grams of the last product are allowed to stand for 40 minutes at room temperature in a solution of hydrogen chloride in glacial acetic acid (1.33 N). The solvent is removed, the residual foam is taken up and pulped with anhydrous ether. It is filtered, dried and 2.08 g. of

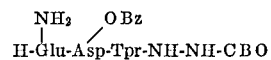

are obtained; $E_{1.2}=0.59$ Glu. To a solution of this product in dimethylformamide in the presence of the equivalent of triethylamine, 1.114 g. of CBO-Pyr-ONP are added, prepared according to Ann. 640, page 145 (1961), and it is kept at 35° C. for 2 days and then it is evaporated to dryness and the residue is taken up with ethyl acetate and water. The insoluble filtrate is washed on the same filter with 1 N aqueous hydrochloric acid, in the cold, with a sodium bicarbonate solution and with water to neutrality. The mixture is dried and crystallized from methanol. 1.7 g. of

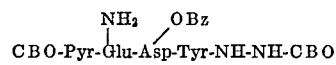

melting at 200–205° C. are obtained. $[\alpha]_D^{20}=-28.3°$ (c.=1 dimethylformamide).

2 g. of the last prdouct are dissolved in 30 cc. of dimethylformamide and hydrogenated in the presence of 10% palladium on charcoal. The catalyst is filtered, it is deeply washed with dimethylformamide and the filtrate is evaporated to dryness in vacuo. The residue is taken up with anhydrous ether, filtered and dried. 1.00 of

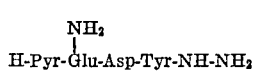

melting at 198–200° C. (with decomposition) are obtained; $E_{1.2}=0.54$ Glu.

Preparation of the second intermediate

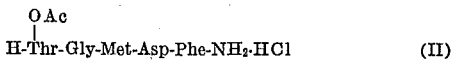  (II)

To a solution of 1.04 g. of H-Try-Met-Asp-Phe-NH₂, prepared according to page 555 of J. Chem. Soc. (1966) in 7 cc. of dimethylformamide, 0.46 cc. of triethylamine and 0.563 g. of CTB-Gly-ONP are added (prep. acc. to Helv. Chim. Acta 45, p. 1637 (1963)) and the solution is allowed to stand for 4 days at room temperature. The solvent is evaporated in vacuo, the residue is taken up with water and ethyl acetate, the organic layer is washed with dilute hydrochloric acid and then with a 5% aqueous solution of sodium bicarbonate, the mixture is evaporated to dryness and crystallized from methanol-ether. 0.95 g. of CTB-Gly-Try-Met-Asp-Phe-NH₂·XI, melting at 190° C., are obtained.

In the meantime, trichlorophenyl ester of carbo-t.butoxy-O-acetyl-L-threonine of the following formula

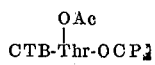

is prepared; 8 g. of

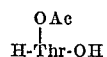

(prepared according to J. Org. Chem 29, page 1629 (1964)) dissolved in 100 cc. of dimethylformamide are treated with 11.9 g. of p-nitrophenyl-t-butylcarbonate and with 14 cc. of triethylamine. After 4 days, further 2.4 g. of nitrophenyl-t-butylcarbonate are added and the solution is allowed to stand for two more days. The solution is evaporated to dryness, taken up with a 5% aqueous solution of sodium bicarbonate and ether. The aqueous solution is acidified and extracted with ether. By eliminating the ether, 3.7 g. of an oily residue are obtained and then diluted with 30 cc. of ethyl acetate and added with 3.14 g. of dicyclohexylamine (DCEA). By addition of ether 4.9 g. of

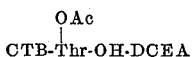

separate, melting at 180° C.; $[\alpha]_D^{20} = +18°$ (c.=1 dimethylformamide). 13.2 grams of this salt are treated at 0° C. with a solution of phosphoric acid until turning acid with Congo red indicator; an oil separates and it is extracted with ethyl acetate. By evaporating the solvent,

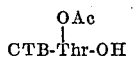

is obtained in the form of a foam (7.3 g.). This product dissolved in 60 cc. of ethyl acetate is added with 5.9 g. of 2,4,5-trichlorophenol and 6.2 g. of dicyclohexylcarbodiimide. After two days, the mixture is filtered and evaporated to dryness. 13.2 g. of

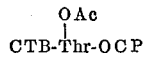

are obtained in the form of an oil, which is used as such.

0.9 grams of H-Gly-Try-Met-Asp-Phe-NH₂ are dissolved in 10 cc. of dimethylformamide and added with 0.95 g. of

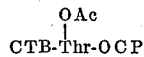

and 0.2 cc. of triethylamine. The mixture is kept at 32° C. for 5 days, the solvent is evaporated in vacuo, the residue is taken up with water and crystallized from dimethylformamide/ethyl acetate, to obtain a product melting at 183–185° C.; $[\alpha]_D^{20} = -17°$ (c.=1 dimethylformamide).

0.6 grams of

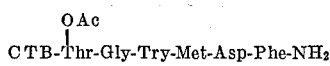

thus obtained, are allowed to stand for 30 minutes at room temperature in a solution of anhydrous hydrogen chloride in glacial acetic acid 1.5 N. By addition of ether,

precipitates; $E_{1.2}=0.51$ Leu, melting at 155° C. (with decomposition); $[\alpha]_D^{21} = -8°$ (c.=1 in 95% acetic acid).

Preparation of the decapeptides III, IV and V 0.41 g. of H-Pyr-Glu-Asp-Tyr-NHNH₂ dissolved in 7 cc. of dimethylformamide are treated at −20° C. with 0.75 cc. of a solution 2 N of anhydrous hydrogen chloride in tetrahydrofurane and then with 0.09 cc. of t.butyl nitrite. After 6 minutes, 0.35 cc. of triethylamine and a solution cooled to −20° C. of 0.41 grams of

in 2.5 cc. of dimethylformamide are added. After 5 minutes, 0.1 cc. of triethylamine are added and it is kept for one hour at −15° C. and at 0° C. for 5 days. The solvent is eliminated in vacuo and the residue is pulped into a solution of citric acid and after evaporation to dryness it is washed with ether and then repeatedly with ethyl acetate. 0.42 g. of

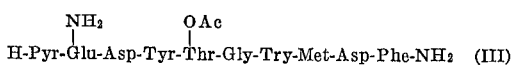  (III)

are obtained, melting at 215°–217° C. (with decomposition); $[\alpha]_D^{21} = -21°$ (c.=1.1 in dimethylformamide); $E_{5.8}=0.33$ Glu.

0.42 gram of this product, in 6 cc. of anhydrous pyridine, are added at a temperature of −10° C. to 2 g. of the complex pyridine —SO₃ suspended in 10 cc. of anhydrous pyridine. It is kept overnight at room temperature. It is poured into water and the residue is treated with a 1 N aqueous solution of sodium hydroxide until persistent turning to timolphthaleine and submitted to purification in countercurrent with the system butanol/ethanol/acetic acid/water (80:16:16:128) (80 passings K=4.3). 0.15 g. of

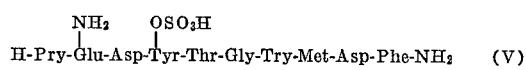  (V)

are obtained; $E_{1.9}=0.54$ Cys (SO₃H); $E_{5.8}=0.41$ Glu.

The product thus obtained may be easily salified with an organic or inorganic base to give corresponding salts.

EXAMPLE 2

The preparation of the decapeptide V is carried out as described in Example 1, but replacing the preparation of the intermediate tetrapeptide IX from the dipeptide VIII as follows:

2.465 g. of

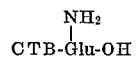

are condensed, through the mixed ethoxyformic anhydride (above cited reference) with 5.71 g. of

(prepared as described in Example 1). The reaction mixture is allowed to stand overnight at room temperature. The solvent is evaporated in vacuo and the residue is dissolved in water and ethyl acetate. The organic layer is separated and washed, in the cold, with a 3% solution of citric acid, with a 5% solution of sodium bicarbonate and then with a 30% solution of sodium chloride. After drying over sodium sulfate, the solvent is evaporated, in vacuo, and the residue is pulped with ether. The mixture is filtered, the solvent is evaporated to dryness. 6.68 g. of

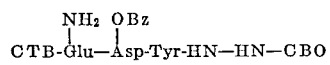
CTB-Glu–Asp-Tyr-HN—HN—CBO are obtained, melting at 173–175° C. On recrystallization from acetone/petroleum ether, the melting point does not change. $[\alpha]_D^{21} = -22.5°$ (c.=1 dimethylformamide).

0.526 g. of

CBO-Pyr are condensed, through the mixed anhydride, with 1.418 g. of

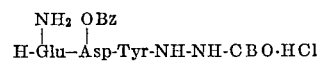
H-Glu–Asp-Tyr-NH-NH-CBO·HCl obtained by treating

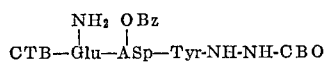
CTB—Glu—Asp—Tyr-NH-NH-CBO with a 1.33 N solution of hydrogen chloride in glacial acetic acid. The reaction mixture is allowed to stand overnight at room temperature. The solvent is evaporated in vacuo and the solid residue is pulped in the cold, with a 3% solution of citric acid, washed deeply with water, then pulped again with ethyl acetate and ether. The mixture is filtered, the solvent evaporated to dryness. On recrystallization from methanol, 1.35 g. of

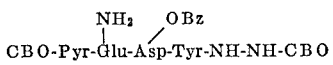
CBO-Pyr-Glu-Asp-Tyr-NH-NH-CBO are obtained, melting at 200–205° C. An analytic sample melts at 205–207° C. $[\alpha]_D^{20} = -28.3°$ (c.=1 dimethylformamide).

EXAMPLE 3

The preparation of the decapeptide V is carried out as described in Example 1, but replacing the preparation of the intermediate pentapeptide XI from the tetrapeptide X as follows: A solution of 8.47 g. of CTB-Gly-ONP, 12.08 g. of H-Try-Met-Asp-Phe-NH$_2$·HCl (X), 5.32 cc. of triethylamine, 1.34 g. of 1,2,4-triazole and 0.2 cc. of glacial acetic acid in 60 cc. of dimethylformamide is allowed to stand for a week at 28° C. The solution is filtered, concentrated in vacuo, acidified in the cold with a saturated solution of citric acid and diluted with water. The precipitate thus obtained is washed and pulped with ether; the mixture is filtered and washed with water and ether alternatively. On recrystallization from methanol-ethylacetate-ether, 11.10 g. of CTB-Gly-Try-Met-Asp-Phe-NH$_2$ (XI), melting at 192° C. (with decomposition are obtained. An analytic sample recrystallized from dimethylformamide-ethyl acetate-ether melts at 196° C. (with decomposition). $[\alpha]_D^{23} = -27.3°$ (c.=1 in dimethylformamide).

A suspension of 10.00 g. of CTB-Gly-Try-Met-Asp-Phe-NH$_2$ in 120 cc. of a 1.33 N solution of hydrogen chloride in glacial acetic acid is stirred for 35 minutes at 25° C. The solvent is evaporated in vacuo and the residue is taken up with anhydrous ether, filtered and recrystallized from methanol-isopropanol. 8.43 g. of H-Gly-Try-Met-Asp-Phe-NH$_2$·HCl, melting at 182–183° C. (with decomposition) are obtained. $[\alpha]_D^{22} = -17°$ (c.=1 in 95% acetic acid); $E_{1,2}=0.59$ Glu, 0.55 Leu.

EXAMPLE 4

The preparation of the decapeptide V is carried out as described in Example 1, but replacing the step for preparing V from III as follows: 1 g. of

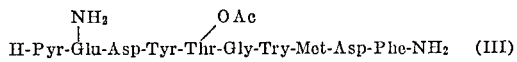
H-Pyr-Glu-Asp-Tyr-Thr-Gly-Try-Met-Asp-Phe-NH$_2$ (III)

in 30 cc. of anhydrous dimethylformamide are added, at $-10°$ to 15.9 of pyridine $-SO_3$ complex suspended in 80 cc. of anhydrous pyridine. The mixture is allowed to stand overnight at room temperature; it is then evaporated to dryness in vacuo. The solid residue is dissolved in 150 cc. of the lower layer of the mixture n.butanol-ethanol-water (5:1:8) and the pH is adjusted to 3.2 with 1 N sodium hydroxide. The mixture is extracted five times with 100 cc. of the upper layer of the above mixture. The extracts are evaporated in vacuo; the residue is taken up with chloroform. The mixture is filtered, the filtrate is washed with chloroform and diethyl ether and then evaporated to dryness. 900 mg. of

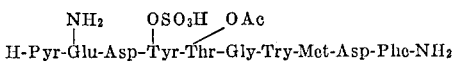
H-Pyr-Glu-Asp-Tyr-Thr-Gly-Try-Met-Asp-Phe-NH$_2$ are obtained. After weak alkaline hydrolysis of this product, followed by acidification and extraction with the upper layer of the above solvent system, 700 mg. of the raw decapeptide V, melting at 224–226° C. (with decomposition) are obtained. The product thus obtained may be purified with chomatography.

Pharmacology

The biological activities of the products of the invention and principally the action on gastric secretion, on cholecyst motility, on pancreas secretion, on biliary secretion and on arterial blood flow have been determined. The results obtained from these experiments are reported in the following tables where the activity corresponding to the product of the invention Pyr-Glu(NH$_2$)-Asp-Tyr (SO$_3$H)-Thr-Gly-Try-Met-Asp-Phe-NH$_2$ (1) is taken as equal to 100 and compared, by weight, with the human gastrin consisting of the polypeptide Pyr-Gly-Pro-Try-Leu(Glu)$_5$-Ala-Tyr-Gly-Try-Met-Asp-Phe-NH$_2$ and with the gastrin like synthetic pentapepide CTB-$\beta$-Ala-Try-Met-Asp-Phe-NH$_2$.

More particularly, Table 1 reports the values corresponding to the following pharmacological actions.

Column I.—Action on hydrochloric secretion: it has been calculated "in vivo" by the volume increase of gastric juice and by the acidity of the secreted juice. The products under examination have been administered subcutaneously in the dog and in the rat.

Column II.—Action on cholecyst motility: it has been calculated in situ on cholecyst of guinea-pig by intravenous administration of the products.

Column III.—Action on biliary secretion: it has been determined by the increase of the biliary flow and of the cholesterol concentration of the bile in the rat by intravenous administration of the products.

Column IV.—Action on the arterial blood flow: it has been determined by a flowmeter placed on the pancreatic duodenal artery after intravenous administration of the products in the dog.

TABLE 1

| Compounds | I Hydrochloric secretion | | II Cholecyst motility, guinea pig | III Biliary secretion, Rat | IV Arterial blood flow, Dog |
|---|---|---|---|---|---|
| | Dog | Rat | | | |
| Pyr-Glu(NH$_2$)-Asp-Tyr(SO$_3$H)-Thr-Gly-Try-Met-Asp-Phe-NH$_2$ | 100 | 100 | 100 | 100 | 100 |
| Human gastrin | 30 | 2 | 0.03 | 2 | |
| CTB-$\beta$-Ala-Try-Met-Asp-Phe-NH$_2$ | 3 | 2 | 0.005 | 0.2 | 3 |

In Table 2 there are reported the active minimum doses (MD) of the decapeptide Pyr-Glu(NH₂)-Asp-Tyr(SO₃H)-Thr-Gly-Try-Met-Asp-Phe-NH₂ determined in different tests.

TABLE 2

| Tests | MD (dosage), (ng./kg.) | Administered |
|---|---|---|
| Stomach hydrochloric secretion (dog) | 100 | Subcutaneously. |
| Stomach hydrochloric secretion (rat) | 15 | Intravenously. |
| Stomach secretion (frog) | [1] 0.0025 | In vitro. |
| External pancreatic secretion (dog) | 3 | Intravenously. |
| External pancreatic secretion (cat) | 10 | Do. |
| Cholecyst motility (guinea pig) | 0.2 | Do. |
| Biliary secretion (rat) | 1000 | Do. |
| Vasodilation of pancreatic duodenal district (dog) | 4 | Do. |
| Arterial blood pressure reduction (dog) | 100 | Do. |

[1] Ng./cc.
NOTE.—1 ng. 0.001 μg.

The products of the invention may be clinically employed especially in the chloecystography, in the stimulation of pancreatic and gastric secretion, in the arterial hypertension and to make alkaline and duodenal contents in case of duodenal ulcers.

The products may be administered by oral or parenteral route in the form of the therapeutic composition usually employed.

We claim:
1. A member of the group consisting of

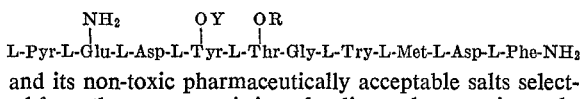

L-Pyr-L-Glu-L-Asp-L-Tyr-L-Thr-Gly-L-Try-L-Met-L-Asp-L-Phe-NH₂ and its non-toxic pharmaceutically acceptable salts selected from the group consisting of sodium salt, potassium salt, mangesium salt, calcium salt, gluconate, tartrate, and ethylenediamine salt, wherein Y is H or SO₃H and R is H or aliphatic acyl of 1 to 4 carbon atoms, with the proviso that when Y is SO₃H R must be aliphatic acyl of 1 to 4 carbon atoms.

2. The decapeptide of claim 1 wherein Y is H and R is H.
3. The decapeptide of claim 1 wherein Y is H and R is aliphatic acyl of 1 to 4 carbon atoms.
4. The decapeptide of claim 1 wherein Y is SO₃H and R is aliphatic acyl of 1 to 4 carbon atoms.
5. The decapeptide of claim 1 which has the formula

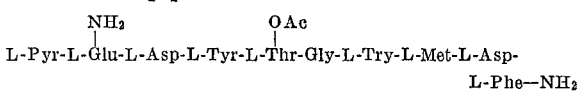

L-Pyr-L-Glu-L-Asp-L-Tyr-L-Thr-Gly-L-Try-L-Met-L-Asp-L-Phe—NH₂

6. The decapeptide of claim 1 which has the formula

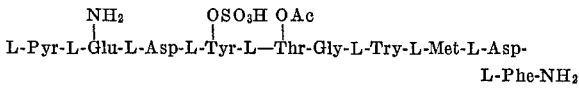

L-Pyr-L-Glu-L-Asp-L-Tyr-L—Thr-Gly-L-Try-L-Met-L-Asp-L-Phe-NH₂

References Cited

Anastasi et al., Experientia 23, 699–700 (1967).
Bernardi et al., Experientia 23, 700–702 (1967).
Erspamer et al., Nature 212, 204 (1966).
Erspamer et al., Experientia 23, 702–703 (1967).

LEWIS GOTTS, Primary Examiner

M. M. KASSENOFF, Assistant Examiner

U.S. Cl. X.R.

424—177